US007440870B2

(12) United States Patent
D'Angelo et al.

(10) Patent No.: US 7,440,870 B2
(45) Date of Patent: *Oct. 21, 2008

(54) SYSTEM FOR MONITORING THE QUALITY OF INDUSTRIAL PROCESSES AND METHOD THEREFROM

(75) Inventors: Giuseppe D'Angelo, Grugliasco (IT); Giorgio Pasquettaz, Vercelli (IT); Andrea Terreno, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/224,117

(22) Filed: Sep. 13, 2005

(65) Prior Publication Data

US 2006/0074602 A1 Apr. 6, 2006

(30) Foreign Application Priority Data

Sep. 14, 2004 (EP) .................................. 04425684

(51) Int. Cl.
*G06F 11/00* (2006.01)
*G06F 15/00* (2006.01)
*H03F 1/26* (2006.01)
*H04B 15/00* (2006.01)

(52) U.S. Cl. .................. 702/188; 702/81; 709/217; 709/223; 700/9; 700/108

(58) Field of Classification Search .................. 702/56, 702/182–188, 81; 709/217, 223, 224; 700/9, 700/17, 19, 108, 95
See application file for complete search history.

(56) References Cited

U.S. PATENT DOCUMENTS 5,227,988 A * 7/1993 Sasaki et al. ................. 708/131
5,353,238 A * 10/1994 Neef et al. ................... 702/184
7,124,063 B2 * 10/2006 D'Angelo et al. ........... 702/188
2002/0168937 A1 11/2002 Clark et al.

(Continued)

FOREIGN PATENT DOCUMENTS

EP 0 247 291 12/1987

(Continued)

OTHER PUBLICATIONS

Lonnblad et al., 'Optimization of Wireless Bluetooth Sensor Systems', Sep. 1-5, 2004, IEEE Article, pp. 2133-2136.*

(Continued)

*Primary Examiner*—Eliseo Ramos-Feliciano
*Assistant Examiner*—Elias Desta
(74) *Attorney, Agent, or Firm*—Nixon & Vanderhye P.C.

(57) ABSTRACT

The invention relates to a system for monitoring industrial processes, comprising sensor means for detecting one or more process quantities in at least one process station, acquisition and processing means operating on signals generated by the sensor means for obtaining information on process quality and means for managing the manufacturing flow operating on the basis of the information on process quality. The acquisition and processing means are arranged locally in the at least one process station, the means for managing the manufacturing flow are arranged in a remote position with respect to the acquisition and processing means, and it is provided for wireless transceiver means for exchanging the information on process quality between the acquisition and processing means and the means for managing the manufacturing flow.

10 Claims, 2 Drawing Sheets

U.S. PATENT DOCUMENTS

2003/0057191 A1    3/2003  Wright et al.

FOREIGN PATENT DOCUMENTS

| EP | 1 361 015 | 11/2003 |
|----|-----------|---------|
| EP | 1 371 443 | 12/2003 |
| EP | 1 275 464 | 5/2004  |

OTHER PUBLICATIONS

Wang et al., 'Communication of Agent-based Adhered Slice of Intelligent Manufacturing System', Aug. 2004, IEEE Article, pp. 708-713.*

Sairam et al., 'Topics in Broadband Access: Bluetooth in Wireless Communicaiton', Jun. 2002, IEEE Publication, pp. 90-96.*

Patent Abstracts of Japan, vol. 2003, No. 11, Nov. 5, 2003 & JP 2003 191079, Jul. 8, 2003.

Patent Abstracts of Japan, vol. 1998, No. 10, Aug. 31, 1998 & JP 10 128538, May 19, 1998.

Patent Abstracts of Japan, vol. 1999, No. 02, Feb. 26, 1999 & JP 10 305366, Nov. 17, 1998.

* cited by examiner

SYSTEM FOR MONITORING THE QUALITY OF INDUSTRIAL PROCESSES AND METHOD THEREFROM

BACKGROUND, SUMMARY AND DETAILED DESCRIPTION

The present invention relates to systems and methods for monitoring industrial processes, comprising sensor means for detecting one or more process quantities in at least one process station, acquisition and processing means operating on signals generated by said sensor means for obtaining information on process quality and means for managing the manufacturing flow operating on the basis of said information on process quality.

Methods and systems as referred to above have already been proposed and used in the past for monitoring on-line for instance laser welding processes, in particular in the case of metal sheet welding. The monitoring system can evaluate the presence of porosities in the welding area, or in the case of butt-jointed thin metal sheets, the presence of faults due to metal sheets overlapping or disjoining. Similar systems have also been used for monitoring the quality of laser cutting operations.

FIG. 1 shows a system for monitoring the quality of a laser process of known type.

With reference to FIG. 1, number 1 globally refers to a system for monitoring the quality of a laser process, for instance a laser welding process. The example refers to the case of two metal sheets 2, 3 welded in a working or process station by means of a laser beam. Number 4 globally refers to the focusing head, including a lens 5 reached by the laser beam originated by a laser generator (not shown) and reflected by a semi-reflecting mirror 6, after passing through a lens L. Radiation E emitted from the welding area passes through the reflecting mirror 6 and is picked up by a sensor 7 consisting of a photodiode suitable for sending its output signal to an electronic control and processing unit 8 associated to a personal computer 9 that manages the process.

In a practical embodiment, the semi-reflecting mirror 6 used is a ZnSe mirror, with a diameter of 2 inches and a thickness of 5 mm. The sensor 7 is a photodiode with spectral response between 190 and 1100 nm, an active area of 1.1×1.1 mm and a quartz window.

FIG. 2 shows in further detail the electronic control and processing unit 8 associated to the personal computer 9. Said processing unit 8 comprises an antialiasing filter 11 operating on the signal sent by the sensor 7, then an acquisition card 12 is provided, equipped with an analog-to-digital converter, which samples the filtered signal and converts it numerically. Said acquisition card 12 is connected directly to the personal computer 9.

The acquisition card 12 acquires the signal emitted by the sensor 7 at a frequency above $2^{16}$ Hertz.

The personal computer 9 implements a quality monitoring system based on the analysis of the acquired signal.

The drawback of systems used until now consists in that the sensor placed inside the focusing head, which acquires the radiation from the welding process, is connected to the acquisition card located in the personal computer, which monitors the process through suitable cables.

Said cables, however, create problems concerning the remote arrangement of acquisition and processing systems. Moreover, said cables lead to further more serious drawbacks if more processes at various welding stations have to be monitored, because in that case more connecting cables have to be laid. As a matter of fact, said connecting cables should have a limited length, so as not to introduce too much noise on the signals they carry. The passage of connecting cables inside the welding station leads to drawbacks due to magnetic interference with power cables. Moreover, in order to have a low noise said connecting cables are high impedance cables and are therefore quite expensive.

The present invention aims at overcoming all the aforesaid drawbacks.

In view of achieving said aim, the object of the invention is a system for monitoring the quality of industrial processes having the characteristics indicated in the foregoing and further characterized in that said acquisition and processing means are placed locally in said at least one process station, said means for managing the manufacturing flow being arranged remotely with respect to the acquisition and processing means, and provided are wireless transceiver means for exchanging said information on process quality between said acquisition and processing means and said means for managing the manufacturing flow.

In the preferred embodiment, said wireless transmission means are radio-frequency transmission means operating for instance according to Bluetooth protocol.

Of course, the object of the invention is also the method for monitoring the quality of industrial processes implementing the system described above.

Further characteristics and advantages of the invention will be evident from the following description with reference to the accompanying drawings, provided as mere non-limiting examples.

In short, according to the proposed system intelligent units are arranged locally at working stations, said intelligent units being configured for acquiring signals from the sensors and obtain quality signals with lower band requirements, which are sent in wireless mode to processors monitoring processes and executing for instance reject management procedures.

Figure 1:
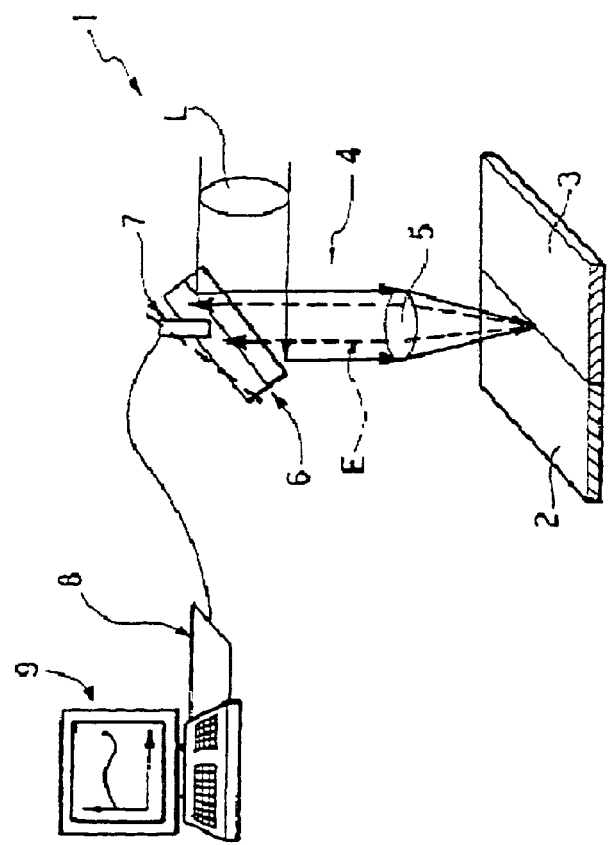
FIG. 1 is a schematic view of a system for monitoring industrial processes according to prior art.
Figure 2:
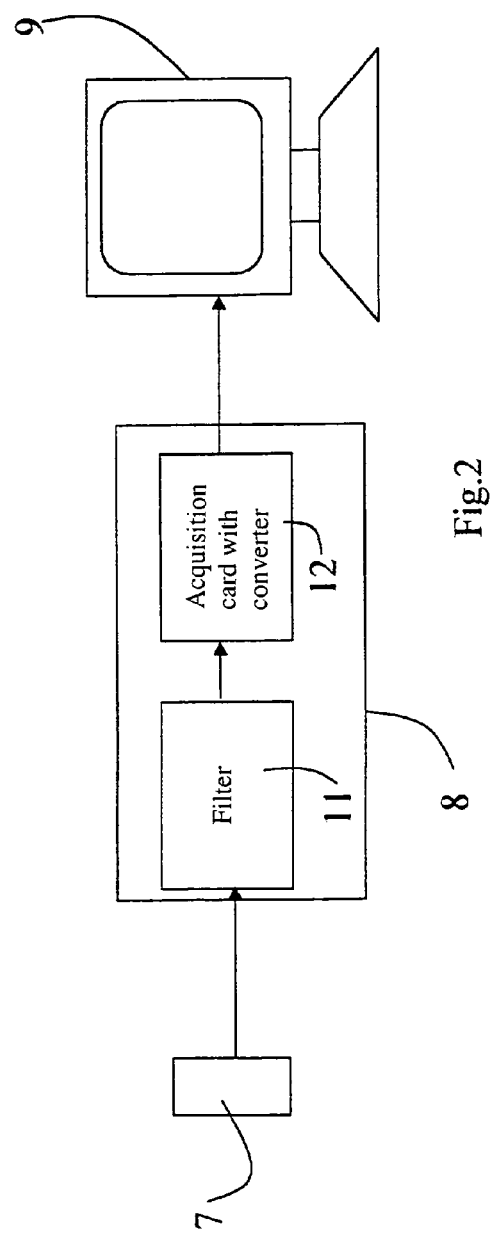
FIG. 2 is a schematic view of a detail of the system of FIG. 1.
Figure 3:
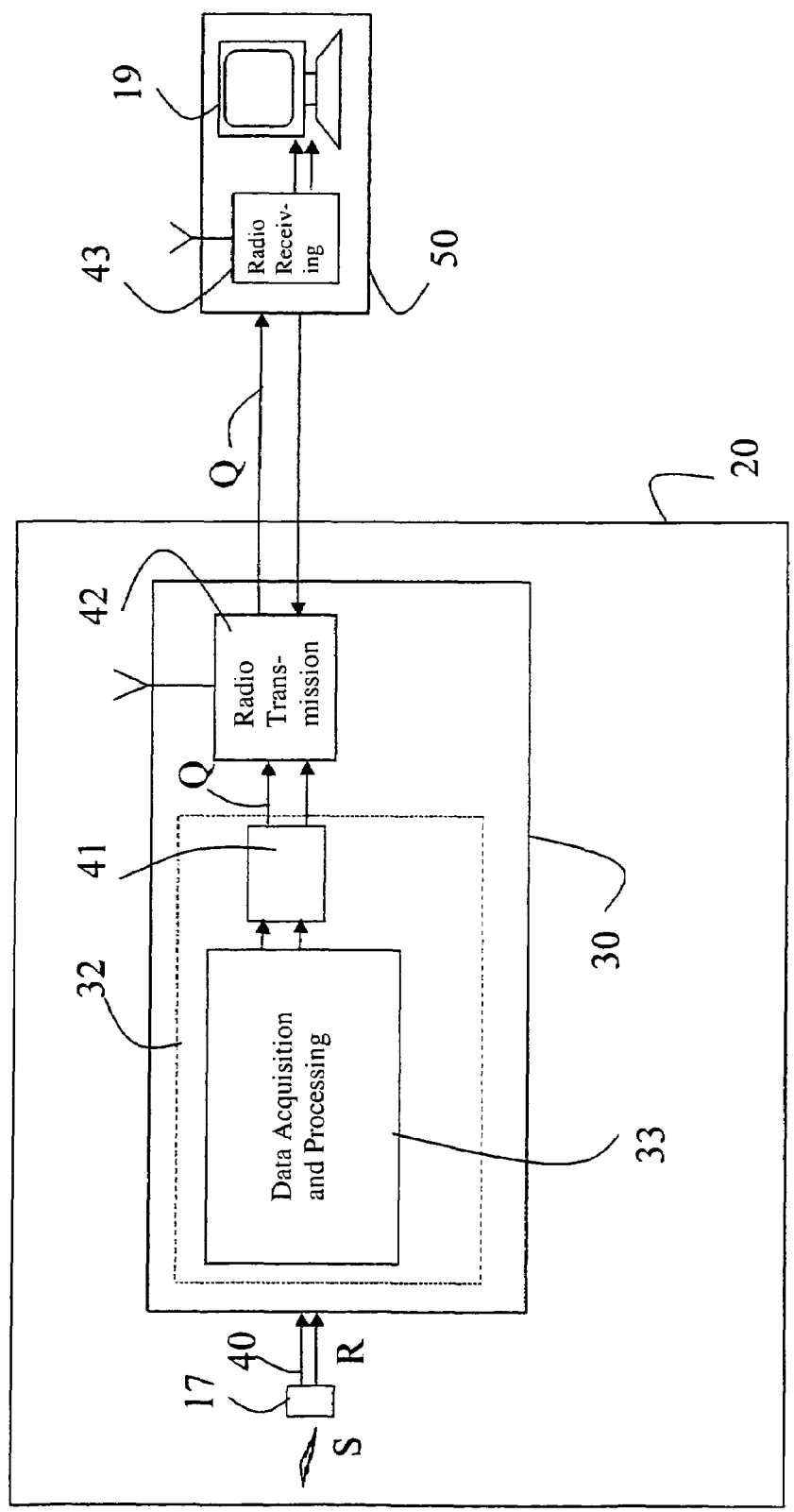
FIG. 3 is a block diagram of the system for monitoring industrial processes according to the invention.

FIG. 3 shows a block diagram of the system for monitoring industrial processes according to the invention, in which number 17 refers to a sensor, placed for instance inside the focusing head of, a $CO_2$ laser, or inside the cavity if the laser is of neodymium-YAG type, in a working station 20. Said sensor 17 is therefore placed near the working station 20 and acquires a radiation S coming from the laser welding process, thus generating an analog voltage signal R, in particular of 0 to 0.5 V.

Said analog voltage signal R is transferred to an acquisition and processing module 32, implemented by a FPGA module (Field, Programmable Logic Array) 33, which contains the software for data acquisition and processing.

The connection, between the sensor 17 and the acquisition module 32 occurs by means of a coaxial cable 40.

The acquisition module 32 is programmed so as to manage the acquisition of the analog voltage signal R from the sensor 17, to process data and generate an output quality signal Q containing the information related to the quality of the process in progress in the adjacent working station 20. Said processing takes place by means of the software previously downloaded into the module 32. Examples of processing procedures for determining the quality of a welding process, which can be implemented into the system proposed here, can be inferred by way of non-limiting example from European patent publications EP 1361015, EP 1275464 and EP 1371443 issued to the Applicant.

Said quality signal Q is thus generally a signal with a limited number of values. For instance, the quality signal Q can take only two logic values, logic zero and logic one, indicating if welding is "good" or "bad", respectively.

The acquisition module 32 can be implemented for instance by means of a HERON-IO5V module, comprising a FPGA circuit Xilinx Virtex II, which operates at an input frequency of 450 MHz and at an output frequency of 200 MHz.

The output signal Q is then transmitted through a communication port 41 of RS232 type included in the acquisition module 32 to a radio transmission unit 42, which uses a Bluetooth protocol, in particular a Bluetooth transmitter at 2.4 GHz.

The acquisition module 32 and the radio transmission unit 42 build up an intelligent elementary unit 30, contained in one housing, which is placed locally in the working station 20 and is electrically connected to the sensor 17 through the local connection represented by the coaxial cable 40. In an alternative version, the sensor 17 can also be integrated into the intelligent elementary unit 30.

The output signal Q sent out by the radio transmission unit 42 is then received in a remote station 50 by a corresponding radio receiving unit 43, i.e. operating on radio signals for instance of Bluetooth type.

By means of a further connection 43 operating through RS232 protocol, the output signal Q is then transferred to a personal computer 19, which acts as supervisor of industrial processes.

Said supervising personal computer 19 has the specific task of managing the manufacturing flow, by executing procedures involving article reject management and the generation of a data bank on manufacturing progress on the basis of the output signal Q.

Thanks to the characteristics referred to above, the system according to the invention provides an intelligent module equipped with sensors, which represents an elementary unit acquiring, processing and transmitting data on process quality from the working station where the industrial process is executed to a remote station in which process quality is monitored and manufacturing flow is managed.

Advantageously, in the system according to the invention only the quality signal is transmitted onto the channel in wireless mode, without the need for a transmission for a remote processing of all data detected by sensors which would require a higher band on the channel and would give rise to a higher error probability due to interferences on the channel. Moreover, the quality signal is little complex and therefore intrinsically more resistant to errors caused by interferences. A further advantage of channel transmission in wireless mode from the working station to a remote working station consists in that transmitted data concerning only the quality signal are not meaningful as such if intercepted, which is not the case for data detected by sensors. The system according to the invention therefore also implements better security profiles.

The system according to the invention enables to build an intelligent network, made up of a given number of intelligent elementary units which interact conveniently with the remotely arranged supervising processor. The proposed solution thus enables to manage simultaneously various manufacturing areas, if necessary also of different nature, since the single process is managed by the corresponding intelligent elementary unit.

By using wireless communication and thus eliminating connection cables between sensor and acquisition card on board the personal computer, the system according to the invention makes it possible to implement elementary multi-sensor monitoring units. Said multisensor units would have proved difficult to implement by means of cables, since a plurality of cables for the signal would have been required.

Conversely, the FPGA monitoring and acquisition module is advantageously equipped with a given number of input channels, i.e. more sensors do not require more FPGA modules. It should be noted that a. FPGA module, once programmed, is a stand-alone module requiring only an external supply.

Thanks to the elimination of connection cables, the system according to the invention further eliminates the problem of noise due to the length of connection cables to the managing computer, when said cables get through the working station, thus obtaining also an evident cost reduction, since high impedance cables should not be used so as to have a low noise.

Thanks to the small size of the monitoring and acquisition module, the system according to the invention is further of very simple installation, also in existing working stations, i.e. not already prepared on purpose.

Clearly, though the basic idea of the invention remains the same, construction details and embodiments can widely vary with respect to what has been described and disclosed by mere way of example, without however leaving the framework of the present invention.

As far as the wireless transmission module is concerned, it can implement radio-frequency transmission protocols and methods differing from Bluetooth standard, both available on the market and produced on purpose, provided that they can transmit the quality signal to the desired distance and with the required band specification. Concerning this, it should be pointed out that since the quality signal requires a very small band width for its transmission, various choices can be made in the system according to the invention, such as for instance use of a very simple transmitter with limited band, or use of a transmitter with wider band, for instance available on the market, and use of the band not involved in quality signal transmission for implementing error correction techniques, transmission of parity codes or transmission of signal with redundancy.

The invention claimed:

1. A system for monitoring industrial processes, comprising sensor means for detecting one or more process quantities in at least one process station, acquisition and processing means operating on signals generated by said sensor means for obtaining information on process quality and means for managing the manufacturing flow operating on the basis of said information on process quality,
wherein
said acquisition and processing means are arranged locally in said at least one process station, and said acquisition and processing means comprise acquisition means for the signals generated by the sensor means, and processing means for obtaining said information on process quality locally, and
said means for managing the manufacturing flow are arranged remotely with respect to the acquisition and processing means, and a wireless transceiver means is provided for exchanging said information on process quality between said acquisition and processing means and said means for managing the manufacturing flow.

2. A system according to claim 1, wherein said wireless transceiver means operate at radio frequency.

3. A system according to claim 2, wherein said radio-frequency transceiver means operate according to Bluetooth standard.

4. A system according to claim 2, wherein said acquisition and processing means are implemented by means of a FPGA module.

5. A system according to claim 4, wherein radio-frequency transmission means included in said transceiver means are associated to said acquisition and processing means, in an intelligent unit arranged locally in said at least one process station.

6. A system according to claim 5, wherein said intelligent unit includes said sensor means integrated therein.

7. A system according to claim 5, wherein there is a plurality of said intelligent units, which are arranged locally in corresponding working stations, said means for managing the manufacturing flow being configured so as to manage said working station on the basis of said information on process quality transmitted by said plurality of intelligent units.

8. A system according to claim 1, wherein said means for managing the manufacturing flow are configured so as to execute procedures involving reject management and the generation of a data bank on manufacturing progress on the basis of information on process quality.

9. A system according to claim 1, wherein said process station performs a laser welding process.

10. A method for monitoring industrial processes, comprising the operations of detecting one or more process quantities in at least one process station, acquiring and processing of signals generated in said detection operation for obtaining information on process quality, managing a manufacturing flow on the basis of said information on process quality,
wherein it further comprises the following operations:
executing said operations of acquisition and processing locally in correspondence of said process,
executing of said operation of management of the manufacturing flow remotely with respect to said process, wireless transmitting of said information on process quality obtained in the process station for executing the operation involving management of the manufacturing flow remotely, said operations being executed through the system according to claim 1.

* * * * *